United States Patent [19]

Jackson

[11] Patent Number: 5,133,206

[45] Date of Patent: Jul. 28, 1992

[54] METHOD AND APPARATUS FOR REFORMING A PORTION OF A MEMBER TO A PREDETERMINED REFERENCE POSITION

[76] Inventor: Donald T. Jackson, 1159 Ashley, Troy, Mich. 48098

[21] Appl. No.: 688,156

[22] Filed: Apr. 19, 1991

[51] Int. Cl.⁵ .................... B21D 28/04; B23P 11/00
[52] U.S. Cl. .................................. 72/420; 72/334; 72/407; 72/452
[58] Field of Search ............... 72/21, 25, 333, 334, 72/412, 414, 415, 407, 450, 452; 29/432.1, 432.2, 521

[56] References Cited

U.S. PATENT DOCUMENTS

| | | | |
|---|---|---|---|
| 3,415,101 | 12/1968 | Reincke | 72/333 |
| 4,403,409 | 9/1983 | Richards | 29/798 |
| 4,706,489 | 11/1987 | Dacey, Jr. | 72/450 |
| 4,760,633 | 8/1988 | Dacey, Jr. | 29/432.1 |
| 4,813,125 | 3/1989 | Dacey, Jr. | 29/714 |
| 4,827,595 | 5/1989 | Dacey, Jr. | 29/432.2 |
| 4,884,431 | 12/1989 | Dacey, Jr. | 72/334 |
| 4,928,388 | 5/1990 | Dacey, Jr. | 29/798 |
| 4,932,128 | 6/1990 | Dacey, Jr. | 30/362 |

Primary Examiner—Robert L. Spruill
Assistant Examiner—Donald M. Gurley
Attorney, Agent, or Firm—Basile and Hanlon

[57] ABSTRACT

An apparatus for forming a portion of a member to a predetermined reference position includes a sensor which locates the actual position of the member. A positioning device positions first and second panel holding members into position to engage the member at the actual located position of the member. A drive unit moves the first and second holding members into engagement with the member to hold the member in a fixed position. The drive unit also moves a forming member into engagement with the member to form a portion of the member between the holding members to the predetermined reference position. A pierce pin, also operated by the drive unit, optionally punches an aperture in the formed portion of the member. A method of forming a portion of a member to a known reference position employs the above-described elements. The method also includes the steps of initiating the movement of the holding members before initiating movement of the forming members such that the holding members engage the member prior to engagement of the forming member with the member.

23 Claims, 9 Drawing Sheets

METHOD AND APPARATUS FOR REFORMING A PORTION OF A MEMBER TO A PREDETERMINED REFERENCE POSITION

BACKGROUND OF THE INVENTION

1. Field of the Invention

The present invention relates, in general, to vehicle assembly apparatus and methods, and, more specifically, to vehicle body panel positioning and attachment apparatus and methods.

2. State of the Art

In the automotive industry, the assembly of vehicles involves the attachment of outer body panels to inner body panels or to body structures formed of joined panels The outer body panels are attached to the inner panels or body structure via fasteners, welds, etc.

In order to provide a quality vehicle which meets design tolerances, it is essential that the inner body panels and/or the inner body structure be precisely located with respect to predetermined three-dimensional coordinates. However, design and manufacturing tolerances and tool wear result in inner body panels which are not as precisely located as desired.

It is known in the art to employ additional spacers or shims to bring inner body panels, or at least the points of attachment of the inner body panels to outer body panels, to precise locations along the X, Y and Z coordinate axes. However, such additional members add cost to the vehicle and require time consuming and expensive labor and manufacturing operations.

U.S. Pat. Nos. 4,760,633 and 4,884,431 disclose a method and apparatus for body panel attachment which reforms a portion of an inner panel member to a precise location. This method and apparatus employs an anvil which is moved into a known position defining the desired precise location of the inner panel attachment surface. Floating support members are then moved toward the inner panel to "find" the inner panel. Upon "finding" or locating the position of the inner panel, the floating support members are locked in a fixed position in engagement with one surface or side of the inner panel.

A ram is then actuated and moves a pad forming member mounted thereon under force into the inner panel to deform a portion of the inner panel between the floating support members into engagement with the anvil. This results in an attachment pad being formed in the inner panel whose surface is located at the precise location desired for attachment to another member, such as an outer body panel. While the pad forming member is still in engagement with the anvil, a punching operation is optionally performed to form an aperture in the pad. A punch is moved by a separate hydraulic cylinder through the pad to form the aperture.

The method and apparatus disclosed in these patents requires separate steps for moving the anvil into a fixed position, advancing the locating support members into contact with the inner panel, locking the locating support members in a fixed position in contact with the inner panel, urging a pad forming member into the inner panel and, then, punching an aperture in the thus formed pad. The ram carrying the pad forming device, the means for locking the anvil and/or the locating support members in a fixed position and the punch are all separately controlled by different actuating devices, such as hydraulic cylinders, a net locating device, etc.

It would be desirable to provide a form and pierce apparatus and method which reforms a portion of a member, such as an inner body panel of a vehicle, to a precise location for subsequent attachment to other panels or members which employs a single actuation device for holding the inner body panel in a fixed position, forming a pad in the inner body panel to a precise, reference location and piercing an aperture in the thus formed pad.

SUMMARY OF THE INVENTION

The present invention is a method and apparatus for forming at least a portion of a member, such as an inner body panel of a vehicle, to a known reference position for subsequent attachment to other panels or members The present apparatus and method also pierces an aperture in the thus reformed portion of the member or inner body panel to aid in the attachment of other panels or members to the reformed portion of the member or inner body panel.

The apparatus of the present invention includes a support housing. Means are mounted on the support housing for locating or sensing the actual position of the member, such as the inner body panel, with respect to a predetermined, known reference position. Means are also mounted on the support housing for fixedly holding the member on adjacent sides of a portion to be reformed to the reference position. The holding means is movable between a first, spaced apart, open position and a second, closed position engaged with the member.

Means are also mounted in the housing and responsive to the locating means for positioning the holding means to engage the member at the actual position of the member. Means are mounted in the housing for forming the portion of the member to be reformed to the reference position. The forming means is movable from a first position spaced from the actual position of the member to a second position engaging the member. Finally, means are mounted in the housing for moving the engaging means and the forming means into engagement with the member.

In a preferred embodiment, the locating means comprises a sensor mounted on the housing for sensing the actual position of the member when the apparatus is brought into a position adjacent the member. The sensor provides an output signal indicative of the actual position of the member with respect to the reference position.

The holding means preferably comprises first and second hold-down members which are engageable with opposed surfaces of the member. First and second arms are mounted in the support housing. Each of the first and second arms is pivotally connected at a first end to the support housing. The first and second hold-down members are mounted on the second ends of the first and second arms, respectively In a preferred embodiment, the first and second arms each comprise a pair of spaced, identical arms, with the first and second hold-down members spanning and connected to the respective pairs of first and second arms.

The forming means preferably comprises third and fourth arms, each having first and second ends. The first ends of the third and fourth arms are pivotally connected to the support housing such that the third and fourth arms are movable between the first spaced apart position and a second closed position with respect to each other. A forming member, preferably in the form of a cylindrical button, is mounted on the second end of the fourth arm and extends outward therefrom toward the second end of the third arm. In a preferred embodiment, the third and fourth arms each comprise a pair of identical, spaced arms, with the forming member or button spanning and connected to the pair of fourth arms.

The positioning means, in a preferred embodiment, comprises an extensible and retractable rod. First and second links are pivotally connected to one end of the rod and the first and second arms. Drive means, responsive to the output of the sensor means, is provided for moving the rod to a position so as to bring the second ends of the first and second arms into a position such that the first and second hold-down members engage the member or inner body panel at the actual position of the member when the first and second arms are moved to the second, closed position.

The moving means preferably comprises a fluid operated cylinder having a reciprocal, extensible and retractable piston rod extending outward therefrom Pin means are mounted on one end of the piston rod transverse to the longitudinal axis of the piston rod. The moving means also includes cam means formed in each of the first and second arms of the holding means and each of the third and fourth arms of the forming means. The cam means are engaged by the pin means for moving the first and second arms between the respective first and second positions and, also, for moving the third and fourth arms of the forming means into and out of engagement with the member upon reciprocal movement of the piston rod.

The cam means preferably comprises first and second, identical cams formed in the first and second arms, respectively. The first and second cams are inverted in orientation from each other in the first and second arms to pivot the first and second arms in a scissors-like action upon movement of the pin means along the first and second cam means.

Third and fourth identical cam means are also formed in the third and fourth arms, respectively. The third and fourth cams are inverted in orientation with respect to each other to pivot the third and fourth arms in a similar scissors-like action upon movement of the pin means along the third and fourth cams.

In a preferred embodiment, each of the first, second, third and fourth cams includes a first arcuate end portion and a second substantially linear portion contiguous with and extending from the first arcuate end portion. The first end portion of the first and second cams is linearly offset from the first end portion of the third and fourth cams and is positioned closer to the pivot connection of the first, second, third and fourth arms to the support housing such that the pivotal movement of the first and second arms is initiated before the initiation of the pivotal movement of the third and fourth arms. This brings the first and second hold-down members on the first and second arms into fixed engagement with the member or inner panel prior to the engagement of the forming member on the fourth arm with the member or inner panel.

In a preferred embodiment, the pin means comprises a first cross pin mounted on the end of the piston rod and slidably engageable with the third and fourth cams in the third and fourth arms, respectively. Second and third cross pins are slidingly engageable with the first and second cams in the first and second arms, respectively. A drive link having first and second ends is connected to the piston rod with the first and second ends extending outward therefrom. The second and third cross pins are mounted in and extend outward from the first and second ends of the drive link, respectively, and are engageable with the first and second cams in the first and second arms, respectively.

The method of the present invention includes the steps of:

a) locating the actual position of the member;

b) positioning member holding means to engage the member at the actual position of the member;

c) moving the member holding means into engagement with the member to hold the member on adjacent sides of a portion of the member to be reformed to a predetermined reference position; and d) moving forming means into engagement with the member to reform the portion of the member between the holding means to a predetermined reference position.

The method of the present invention also includes the optional step of piercing an aperture in the portion of the member which has been reformed to the predetermined reference position.

The steps of moving the holding means and the forming means into engagement with the member or inner panel comprises the steps of camming the holding means and the forming means from a first position spaced from the member to a second position in engagement with the member. The method also includes the step of initiating the camming of the holding means from the first to the second positions before the step of camming the forming means from the first to the second positions is initiated such that the holding means are brought into engagement with the member before the forming means engages the member The apparatus and method the present invention is configured to reform a portion of a member, such as an inner body panel member of a vehicle, to a predetermined reference position in a simple and expedient manner. The apparatus and method utilizes a single drive source, such as a fluid operated cylinder, for controlling the engagement of holding members with the panel as well as movement of a forming member into the panel and the optional piercing of the reformed portion of the panel by a piercing member or button.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
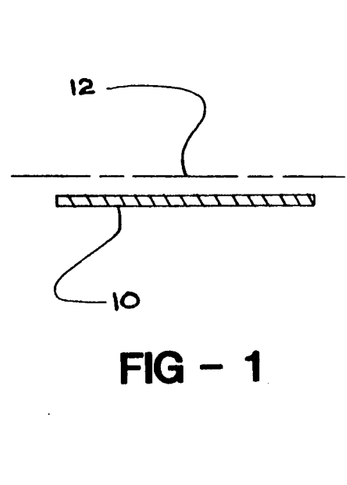
FIG. 1 is a schematic representation of a member, such as an inner body panel member of a vehicle, with respect to a predetermined reference position.
Figure 2:
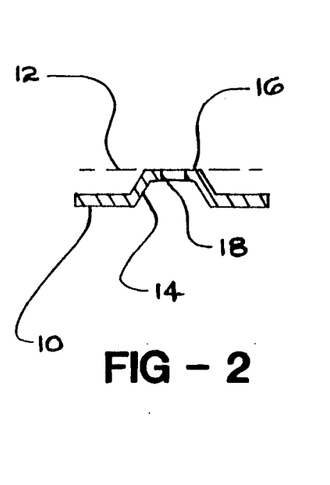
FIG. 2 is a schematic representation of the forming of a portion of the member shown in FIG. 1 to the predetermined reference position by the apparatus and method of the present invention.
Figure 3:
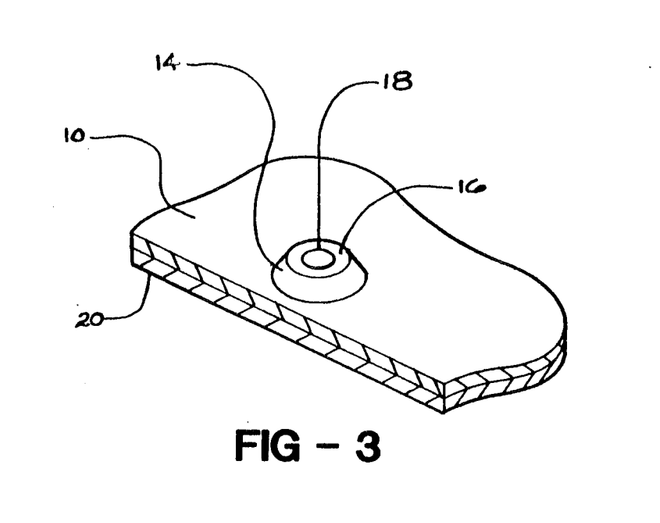
FIG. 3 is a perspective view showing the formed portion of the inner panel member.

Referring now to the drawing, and to FIGS. 1-4 in particular, there are depicted schematic representations of a typical member 10, such as an inner body panel of a vehicle. A side end flange of the panel 10 is shown in FIG. 1. The member or panel 10 may be employed with the apparatus of the present invention, described hereafter, in a single thickness or it may comprise multiple panels arranged in an overlaying stack, as shown in FIG. 3 by way of example only.

As is known in vehicle construction, during the assembly of a vehicle, the inner panel member 10 is transferred via suitable equipment to a work station or cell. The panel 10 assumes the position shown in Figure which is typically spaced from a predetermined, known reference position or plane 12. This space between the actual position of the inner panel 10 and the reference position 12 may be intentionally designed into the panel 10 or the structure to which the panel 10 is attached or it may result from manufacturing tolerance and tool wear during the assembly operation. Nevertheless, it is necessary to reform a portion of the panel 10 to the reference position 12 so that the panel 10 may be precisely attached to other members, such as outer body panels.

Figure 4:
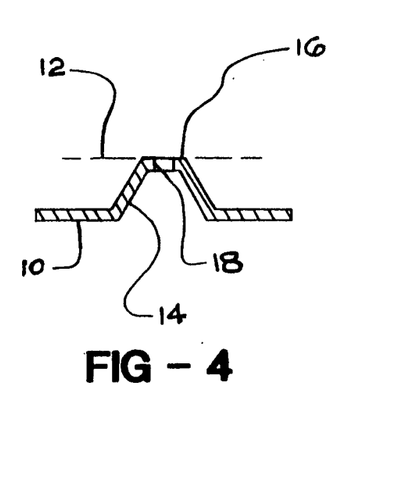
FIG. 4 is a schematic representation of the forming of the member or inner panel to the reference position, but illustrating a different actual position of the member or inner panel.

According to the present invention, and as shown in FIGS. 2, 3 and 4, a portion of the panel 10 is reformed into a pad 14 which extends outward from the planar surface of the panel 10. The exterior surface 16 of the pad 14 is located precisely at the predetermined reference position 12. An aperture or through bore 18 may also be formed, such as by piercing or punching, through the pad 14 so as to enable the use of conventional fasteners to attach the inner panel 10 to other members or panels.

It is further noted that the pad 14 may also be formed in a multiple panel stack, such as the two panel stack 10 and 20 shown in FIG. 3.

Figure 5:
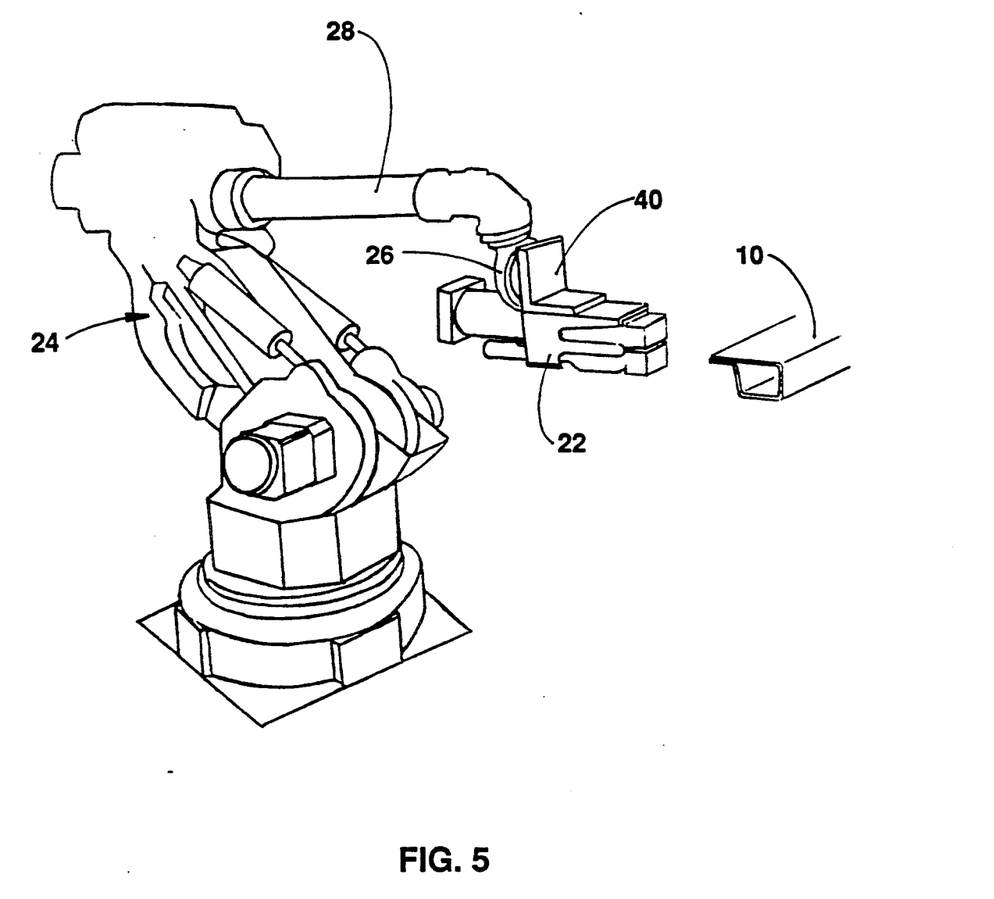
FIG. 5 is a perspective view showing the mounting of the apparatus of the present invention on a robot.

Referring now to FIG. 5, the apparatus of the present invention denoted in general by reference number 22 may be employed with any suitable automated equipment or tool which is capable of moving the apparatus 22 into a known position with respect to the coordinates of the panel 10 mounted in a suitable fixture or work station. Thus, as shown in FIG. 5, an automatic, programmed robot 24 is employed to move the apparatus 22 into the desired position adjacent to the panel 10. As is well known, the robot 24 executes a stored control program to move an end effector 26 mounted on the end of an arm 28 through a predetermined three-dimensional path of movement. The apparatus 22 is attached by suitable means to the end effector 26 on the end of the arm 28 of the robot 24.

The robot 24, in executing its control program, will move the end effector 26 and the apparatus 22 attached thereto into a known position with respect to the three-dimensional coordinate position of the panel 10. During such movement, the robot 24 moves the apparatus 22 toward the panel 10 and, in a last step, moves the apparatus 22 downward a short distance, such as 10 mm. The purpose for this downward movement will be described hereafter.

Figure 6:
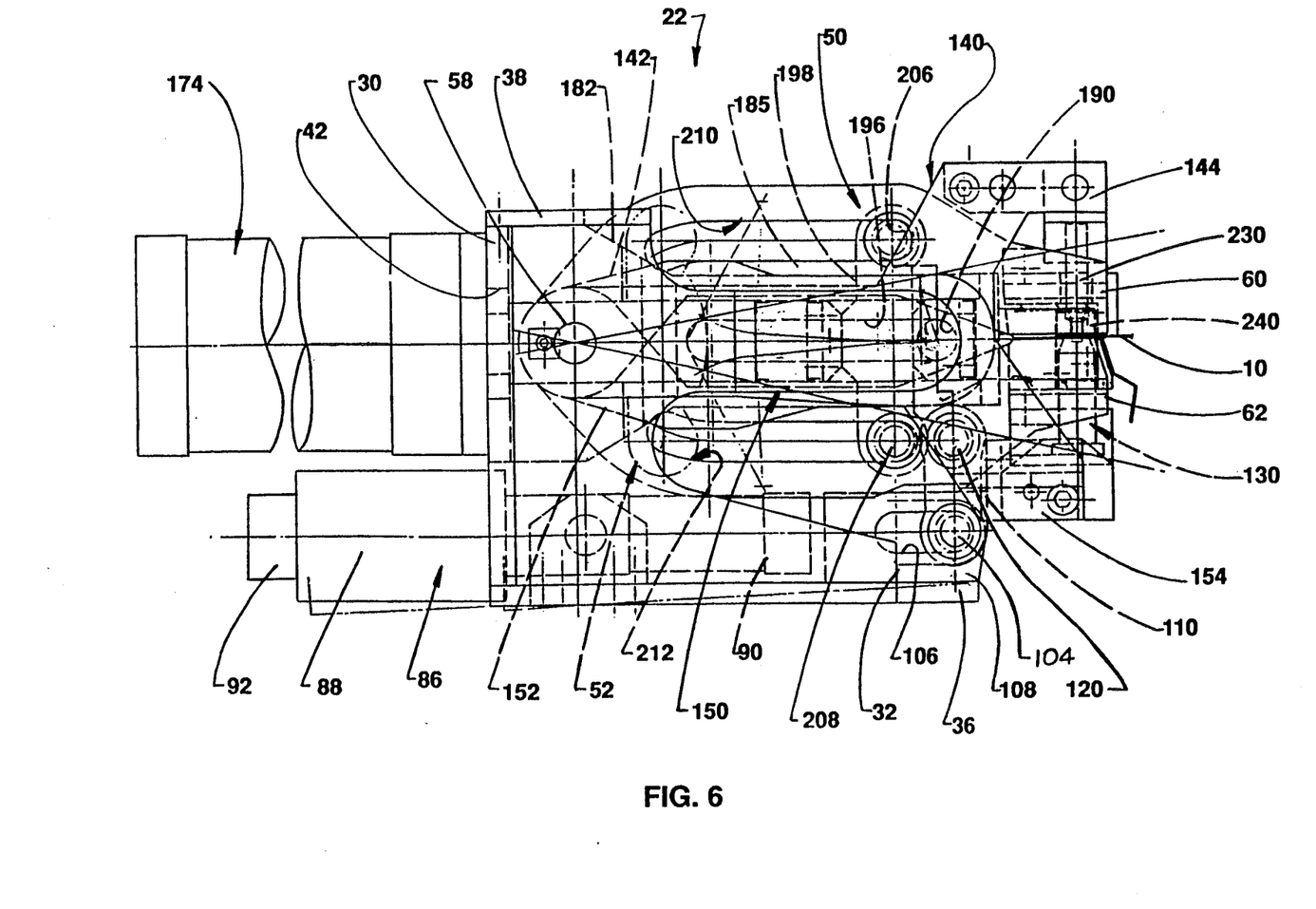
FIG. 6 is a front elevational view of the apparatus of the present invention shown generally in FIG. 5.
Figure 7:
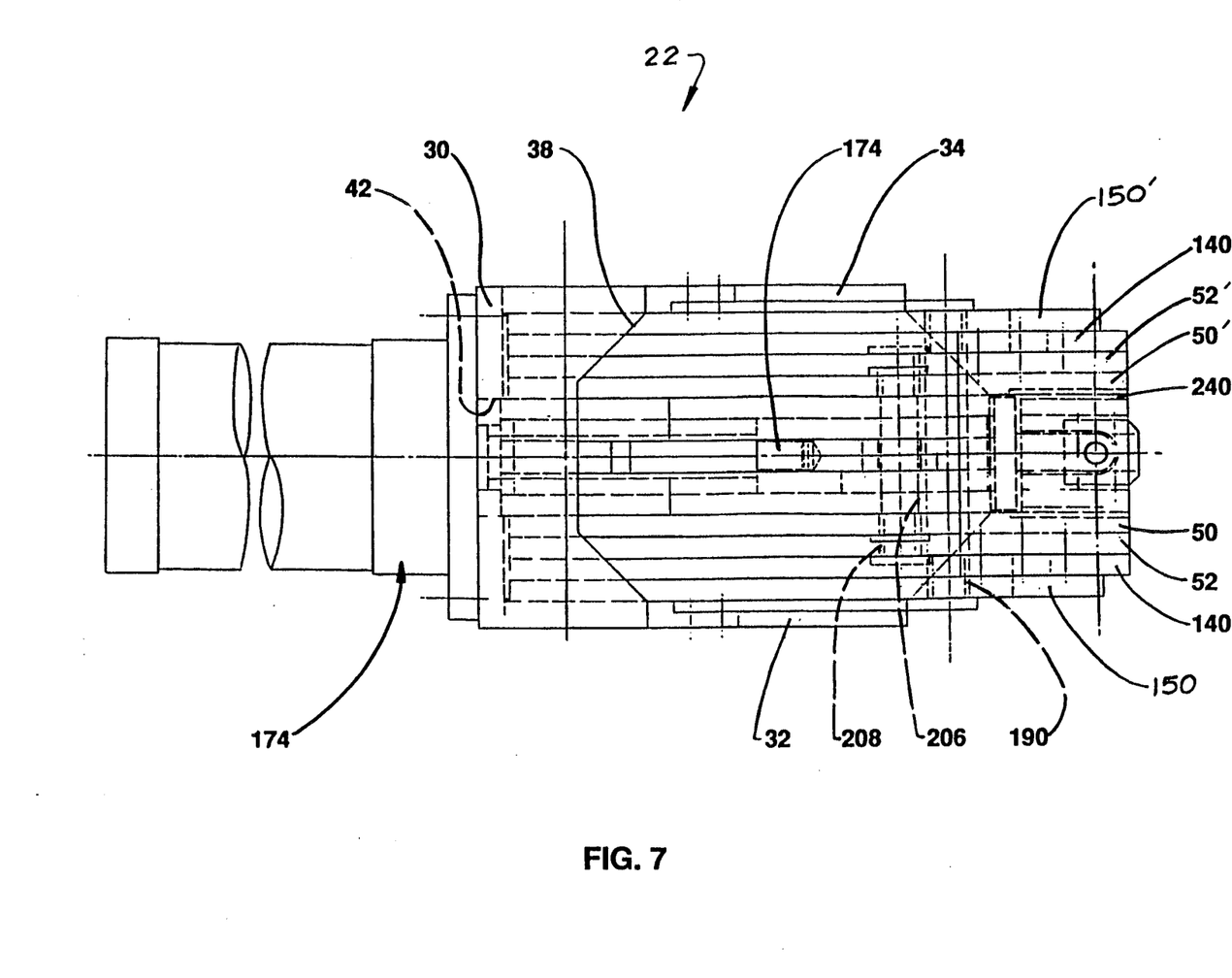
FIG. 7 is a plan view of the apparatus shown in FIG. 6.
Figure 8:
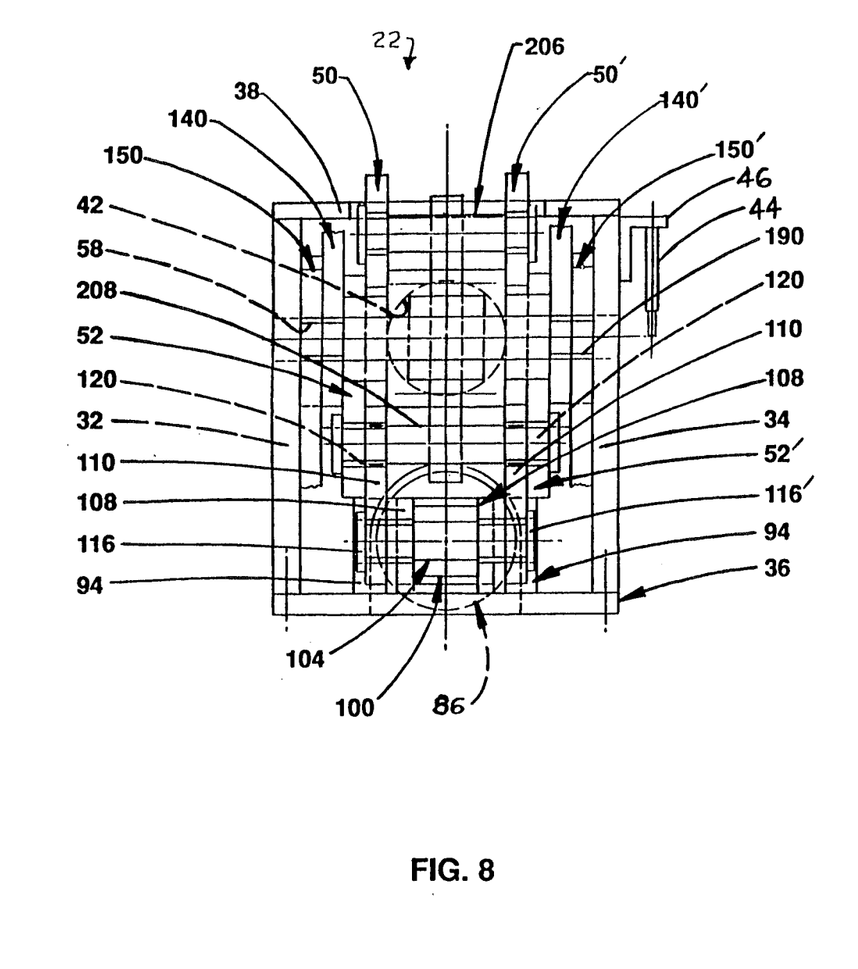
FIG. 8 is a right hand end view of the apparatus shown in FIG. 6, with the holding means and the forming means being removed.
Figure 12:
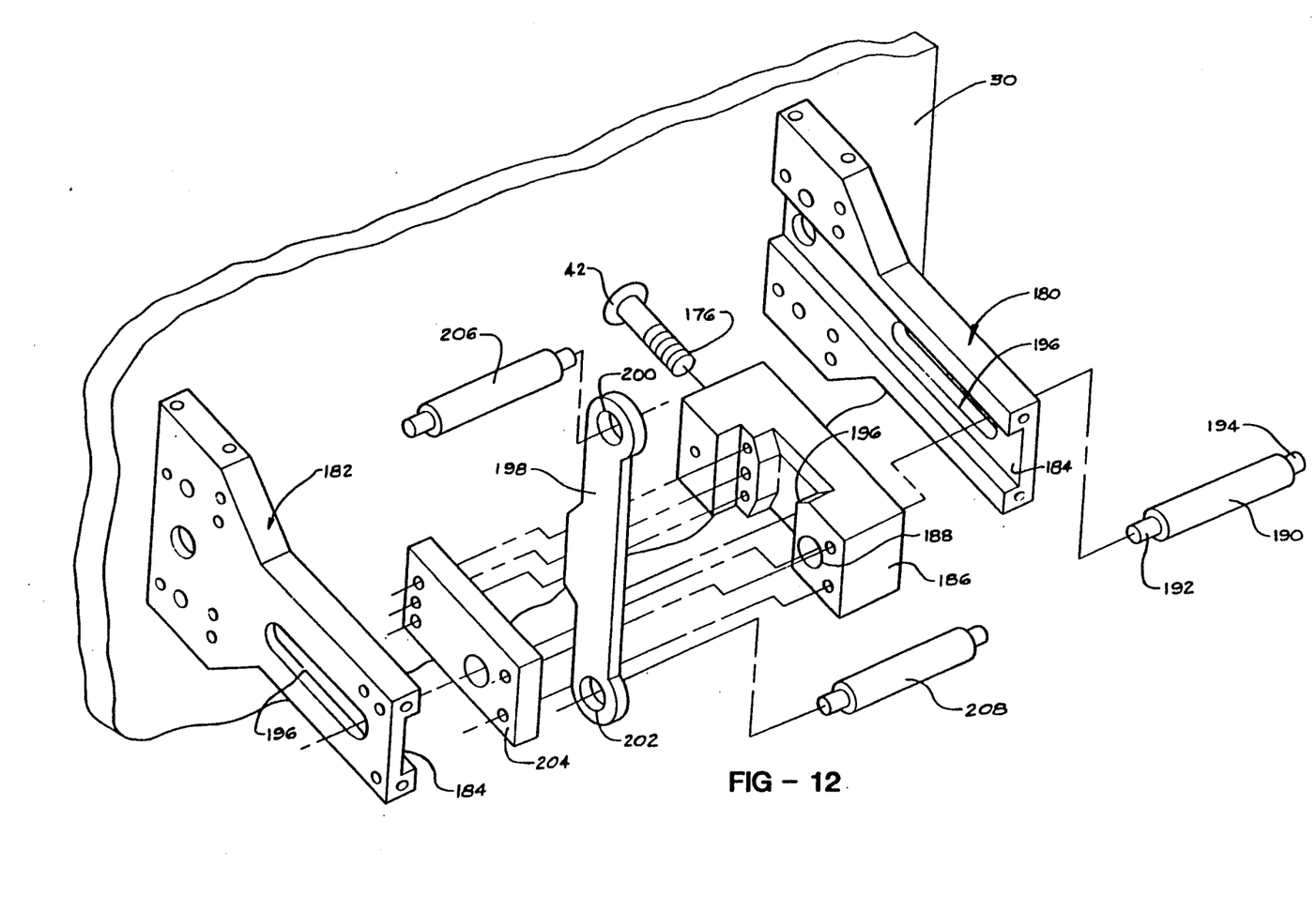
FIG. 12 is an exploded, perspective view of a portion of the moving means of the apparatus of the present invention.
Figure 13:
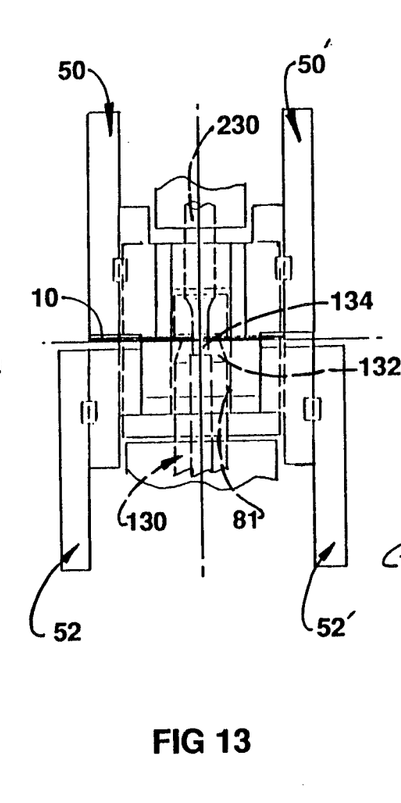
FIG. 13 is a partial, right hand end view showing the position of certain components of the apparatus during an intermediate sequence step of operation.

Referring now to FIGS. 6-8, the apparatus 22 includes a support housing formed of a mounting plate 30, opposed side plates 32 and 34, a bottom plate 36 and an upper cover plate 38. The plates 30, 32, 34, 36 and 38 are joined together into a unit or integral assembly by means of suitable fasteners which extend through apertures formed in the various plates. For clarity, all of such apertures and fasteners have not been depicted in the drawing. The apparatus 22 is attached to the robot 24 via a connection between one of the plates, such as the bottom plate 36, to a suitable attachment member 40 mounted on the end of the end effector 26 of the robot 24, as shown in FIG. 5. As shown in FIGS. 6, 7 and 12, the mounting plate 30 has an enlarged aperture 42 formed therein. The aperture 42 provides an opening for a piston rod to reciprocally extend therethrough, as described in greater detail hereafter As shown in FIG. 8, the apparatus 22 includes a means for locating the position of the panel member 10 with respect to the predetermined reference position 12. In a preferred embodiment, the locating means comprises a sensor 44 which is mounted via a bracket 46 to the side plate 34. The sensor 44 may be any type of sensor which is capable of providing distance output information. By way of example only, the sensor 44 comprises a LVDT sensor which provide an output signal indicative of the distance the sensor 44 travels after the apparatus 22 is brought into proximity with the panel 10 and sensor 44 contact the panel 10 during the final downward movement of the arm 28 of the robot 24, as described above. The output signal from the sensor 44 is input to a suitable control means, such as the control employed to operate the robot 24. This distance signal is utilized by such control to determine the actual position of the panel 10 with respect to the predetermined reference plane or position 12.

As shown in FIGS. 6-9, the apparatus 22 includes means for fixedly holding the panel member 10 on adjacent sides of the portion 14 to be reformed. The holding means is movable between a first open position spaced from the panel member 10 and a second closed position engaged with the panel member 10.

In a preferred embodiment, the holding means comprises first and second arms 50 and 52, respectively. Each of the first and second arms 50 and 52 has a first end 54 and 56, respectively, which are pivotally interconnected via a crosswise extending shaft or pin 58 which is supported at its outer ends by the side plate 32. Each of the first and second arms 50 and 52 also has an opposed second end 60 and 62, respectively.

In a preferred embodiment, the first arm 50 comprises a pair of spaced, identically-formed arms 50 and 50', each of which has first and second ends 54 and 60. Similarly, the second arm 52 comprises a pair of identically-constructed, spaced second arms 52 and 52', each of which has a first end 56 and a second end 62. A separate shaft 58 extends through the side plate 34 to pivotally connect the first ends 54 of the arms 50' and 52' to the support housing.

As shown more clearly in FIGS. 7 and 8, the first arms 50 and 50' are arranged as an upper inner arm pair and are located inboard of the second arms 52 and 52' which act as a lower outer arm pair.

Figure 9:
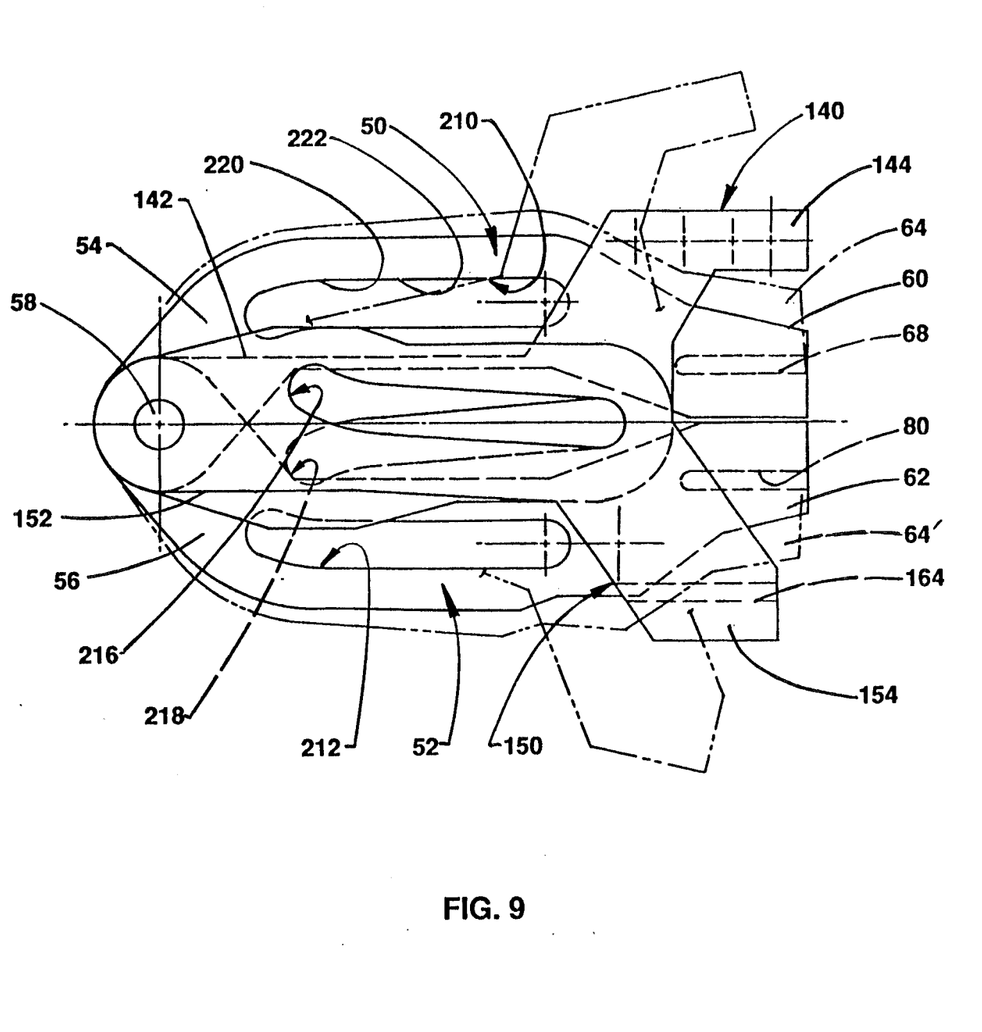
FIG. 9 is an enlarged, front elevational view depicting the holding and forming means shown in FIG. 6.

Each of the first and second arms 50 and 52 are movable, by moving means, described in detail hereafter, between a first, spaced apart position shown in phantom in FIG. 9 and denoted by reference numbers 64 and 64' in which the second ends 60 and 62 are spaced from each other to a second position shown in solid in FIG. 9 in which the opposing surfaces of the second ends 60 and 62 of the first and second arms 50 and 52 are in close proximity with each other and spaced apart by a small gap or space sized to receive the thickness of the panel 10 or multiple panels therebetween.

Figure 10:
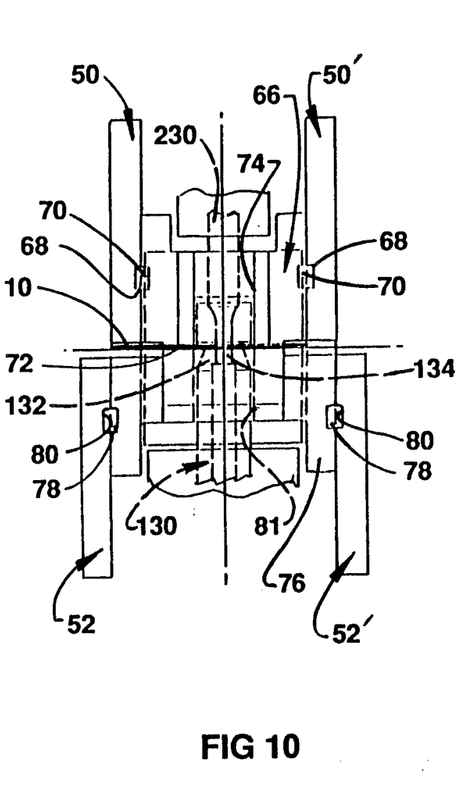
FIG. 10 is a partial, right hand end view showing the position of the holding means of the apparatus in the second, closed position.

As shown more clearly in FIG. 10, a first or upper hold-down member 66 is connected to the second ends 60 of the first arms 50 and 50'. Key ways 68 formed in the second ends 60 of each of the first arms 50 and 50' and the outer side walls of the first hold-down member 66 and receive keys 70 for aligning and connecting the first hold-down member 66 to the first arms 50 and 50'. Suitable fasteners may also be employed to securely connect the side walls of the first hold-down member 66 to the second ends 60 of the first arms 50 and 50'.

The first or upper hold-down member 66 has a panel engaging surface 72 which extends substantially across the space between the first arms 50 and 50'. A central opening or bore 74 is formed in the first hold-down member 66 for reasons which will become more apparent hereafter. The panel engaging surface 72 is adapted to engage one surface, such as the upper surface, of the panel member 10 when the first arms 50 and 50' are moved to the second position.

Similarly, a second or lower hold-down member 76 is connected to the second arms 52 and 52' via aligned keys 78 and key ways 80 formed in the opposing surfaces of the second ends 62 of the second arms 52 and 52' and the side walls of the second hold-down member 76. Suitable fasteners extend through apertures formed in the second ends 62 of the second arms 52 and 52' to securely connect the second hold-down member 76 to the second ends 62 of the second arms 52 and 52'. A central bore 81 extends through the second hold-down member 76 and is aligned with the bore 74 in the first hold-down member 66.

Figure 11:
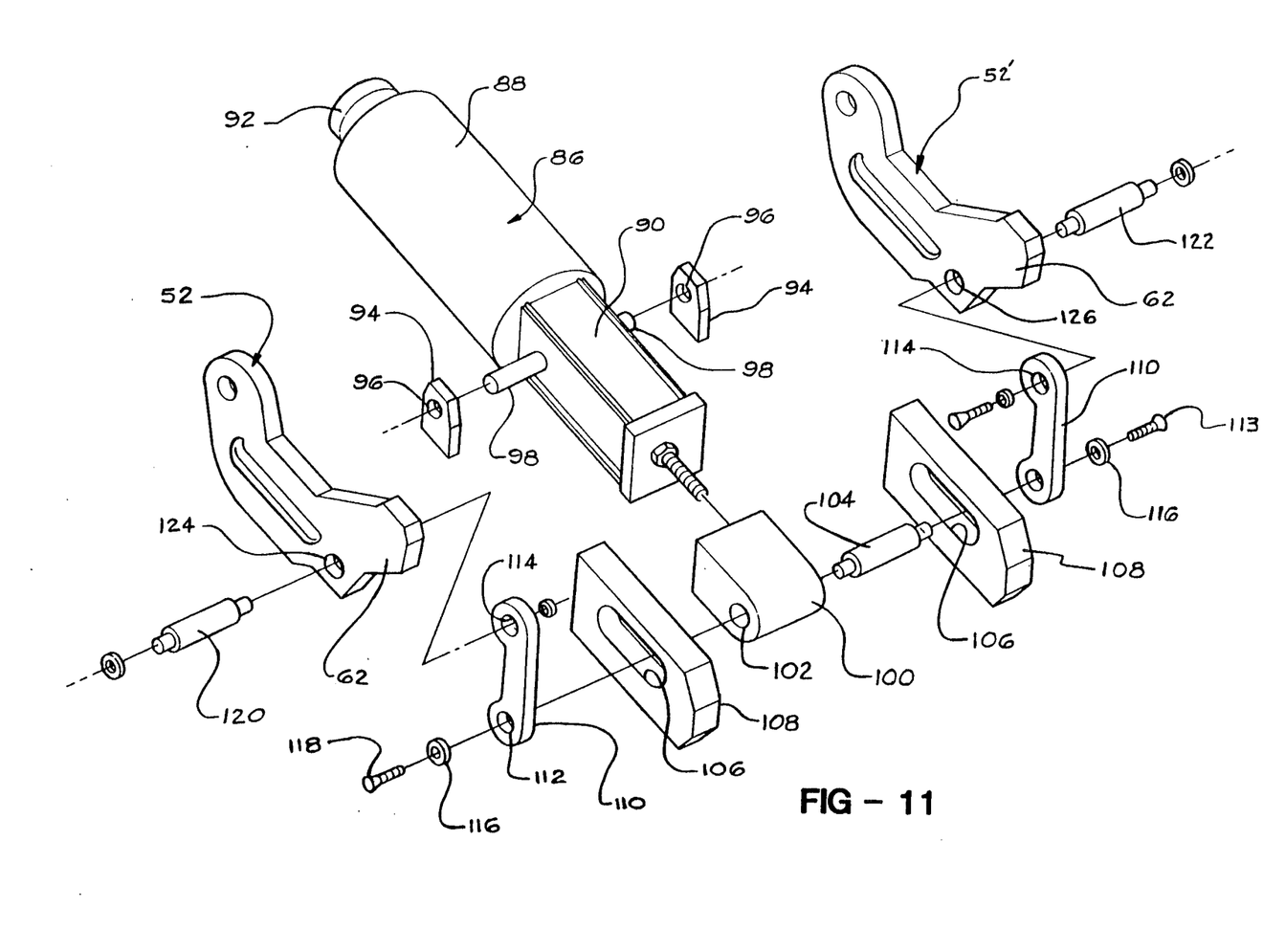
FIG. 11 is an exploded, perspective view of the components of the positioning means of the apparatus of the present invention.

The apparatus 22 also includes means for positioning the holding means or first and second arm pairs 50 and 52 such that the holding means engages the panel member 10 at the actual position of the panel member 10 as sensed by the sensor 44 of the locating means. As shown in FIGS. 6, 8 and 11, the positioning means includes a reciprocal rod 84 which is extensibly and retractably reciprocated by a drive means, such as an electric cylinder 86. The electric cylinder 86, by way of example only, may be a device manufactured by Industrial Devices Corporation of Novato, California, Model No. H-995A-2-MT2-MT1. This device includes a bi-directional electric motor 88 which drives a ball screw shown generally by reference number 90 to reciprocally extend and retract the rod 84. An encoder 92 is connected to the motor 88 for providing position information relating to the travel distance of the rod 84. Such position information is used by the robot control to selectively energize the motor 88.

The drive means 86 is mounted in the support housing via a pair of trunnions 94 which are attached to the bottom plate 36 of the support housing. The trunnions 94 include a through bore 96 which fixedly receives pins 98 attached to and extending outward from opposed sides of the drive means 86.

The outer end of the rod 84 is fixed within a clevis 100 which has a transverse through bore 102 extending therethrough. A cross pin 104 is mounted within the bore 102 in the clevis 100. The outer ends of the pin 104 slidingly engage slots 106 formed in a pair of guide blocks 108 which are fixed to the bottom plate 36 of the housing. A pair of connector links 110 each includes spaced bores 112 and 114. The outer ends of the pin 104 extend through the bores 112 in each of the links 110 and are secured in position by means of a shaft retainer 116 and a fastener 118, such as a flat head screw. The screw 118 extends through the shaft adapter 116 into on end of the pin 104.

The second bores 114 in each of the links 110 each receive one of a pair of second pins 120 and 122. The pins 120 and 122 extend through bores 124 and 126, respectively, formed in the second arms 52 and 52' to pivotally interconnect the second ends 62 of the second arms 52 and 52' to the rod 84. Due to the rigid interconnection of the first arms 50 to the second arms 52, as described hereafter, extension or retraction of the rod 84 based on sensor 44 output information locating the actual position of the panel member 10 will cause a corresponding pivotal movement of the links 110 and a clockwise or counterclockwise rotation of the second ends 62 of the second arms 52 and 52' about their pivot connection to the shafts 58. This pivotal movement of the second arms 52 and 52' which is transmitted to a corresponding movement of the first arms 50 and 50' results in a positioning of the first and second arm pairs 50 and 52 to the actual position of the panel 10 as sensed by the sensor 44.

Thus, based on the output of the sensor 44 which is related to the distance of the actual position of the panel member 10 from the reference position 12., the control means controlling the robot 24, or a specialized control specifically for the positioning means, will energize the motor 88 to extend or retract the rod 84 so as to bring the first and second arms 50 and 52 of the holding means into a position to engage the panel 10 when the arms 50 and 52 move to their second closed position as described hereafter.

The apparatus 22 also includes means for forming a portion of the panel member 10 to be reformed to the reference position 12. As shown in FIGS. 6, 8, 9 and 14, the forming means includes a forming member 130, such as a button. The button 130 has an elongated, cylindrical shape with a conical head having inclined side walls 132 which terminate in a planar flat end 134. The conical-shaped end of the button 130 forms the pad 14 in the panel member 10, as shown in FIG. 3 and described hereafter. An elongated through bore 136 extends through the length of the button 130 for reasons which will become more apparent hereafter.

The forming means also includes third and fourth arms. Each of the third and fourth arms preferably comprises a pair of identical, spaced arms. Thus, the forming means includes a pair of third arms 140 and 140' which act as an upper outer arm pair. Each of the third arms 140 and 140' has a first end 142 which is pivotally connected by the shafts 58 to the support housing as shown in FIGS. 6 and 8. Each of the arms 140 and 140' also has an opposed second end 144.

The fourth arm of the forming means also preferably comprises a pair of identically-shaped, spaced fourth arms 150 and 150'. The fourth arms 150 and 150' are positioned outboard of the third arms 140 and 140' and function as a lower outer arm pair. Each of the fourth arms 150 and 150' has a first end 152 which is pivotally connected to the shafts 58. A second end 154 is also formed on each of the fourth arms 150 and 150' opposite from the first ends 152 thereof.

Figure 14:
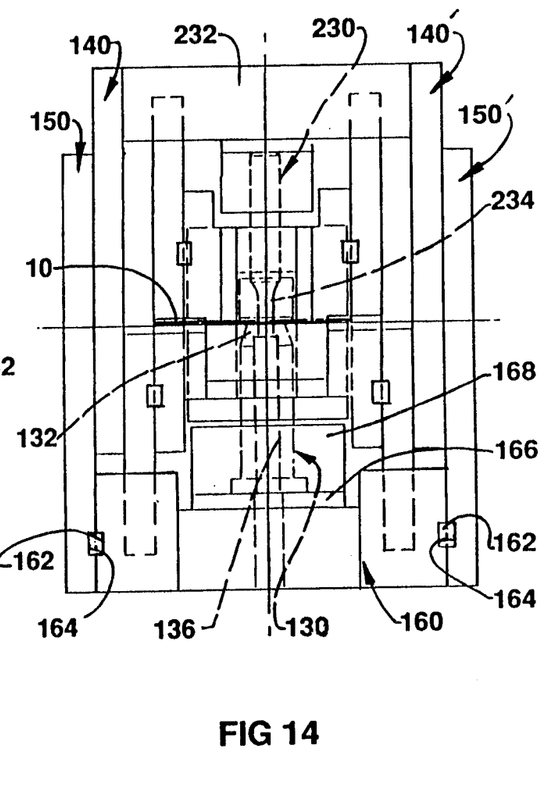
FIG. 14 is a partial, right hand end view showing the position of the elements of the apparatus of the present invention in their final operation state.

A button retainer mounting block 160 is connected to the fourth arms 150 and 150' via a key 162 and key ways 164 formed in each of the second ends 154 of the fourth arms 150 and 150' and the opposed side walls of the button retainer mounting block 160 as shown in FIG. 14. Fasteners extend through the second ends 154 of the fourth arms 150 and 150' to securely connect the button retainer mounting block 160 to the fourth arms 150 and 150'. A backing plate 166 is mounted on a central portion of the button retainer mounting block 160 and supports a button retainer 168 which fixedly receives the button 130. In this manner, the button 130 moves toward the panel 10 upon pivotal movement of the fourth arms 150 and 150' as described hereafter.

Means are also provided for moving the first and second arm pairs 50 and 52 and the third and fourth arm pairs 140 and 150 between the respective first and second positions. As shown in FIGS. 6, 7 and 12, the drive means preferably comprises a fluid operated cylinder 174. The cylinder 174 may be either air or hydraulically operated and, as is conventional, includes a reciprocal piston rod 176 mounted on an internal piston. The rod 176 extends outward from the cylinder 174 and reciprocates between retracted and extended positions upon selective bi-directional activation of the cylinder 174 in a suitable manner, such as by control valves, not shown.

As depicted in FIG. 12, the piston rod 176 acts as a linear drive member and extends through the aperture 42 in the mounting plate 30 of the support housing. A pair of identical, spaced center cam track members 180 and 182 are secured by suitable fasteners to the mounting plate 30 and extend outward therefrom. Each of the center cam track members 180 and 182 has an elongated, open-ended recess or notch 184 formed therein which slidingly receives and guides a rod end cap 186 which is secured to the end of the piston rod 176.

The rod end cap 186 has a transverse extending bore 188 formed therein which receives a drive pin 190. The outer ends 192 and 194 of the drive pin 190 extend through elongated slots 196 formed in each of the center cam track members 180 and 182 and slidably engage the third and fourth arms 140, 140', 150 and 150', as described hereafter.

The rod end cap 186 has a centrally located recess 196 formed therein which fixedly receives a drive link 198. The drive link 198 has first and second spaced bores 200 and 202 formed at opposite ends. A cover 204 is secured by fasteners, not shown, to the side surface of the rod end cap 186 for securely mounting the drive link 198 to the rod end cap 186.

A first link pin 206 extends through the first bore 200 in the drive link 198 and engages the first arms 50 and 50', as described hereafter. A second link pin 208 is mounted in and extends outward through the second bore 202 in the drive link 198 and engages the second arms 52 and 52' as described hereafter.

Referring briefly to FIG. 9, first cam means 210 are formed in each of the first arms 50 and 50'. Likewise, second cam means 212 are formed in each of the second arms 52 and 52'. The first and second cam means 210 and 212 are identically constructed, but are arranged in opposed inverted relationship with respect to the cams in the opposite pair of first or second arms 50 and 52. The outer ends of the first link pin 206 slidably engage the first cams 210 in the first arms 50 and 50'. The outer ends of the second link pin 208 slidingly engage the second cams 212 formed in the second arms 52 and 52'.

In this manner, extension and retraction of the piston rod 176 is translated through the drive link 198 to simultaneous scissor-like movement of the first and second arm pairs 50 and 52 between the first and second positions as shown in FIG. 9. Further, due to the rigid interconnection of the first and second arm pairs 50 and 52, movement of the second ends 62 of the second arms 52 and 52' by the positioning means, as described above, will result in a corresponding and identical movement of the first arm pair 50 to accurately position the first and second arms 50 and 52 so as to be able to engage the panel member 10 in the actual position of the panel member 10.

Third and fourth cam means 216 and 218, respectively, are formed in each of the third arms 140 and 140', respectively and the fourth arms 150 and 150'. The third and fourth cam means 216 and 218 are also identically constructed; but are arranged in opposed, inverted relationship with respect to the cam means in the opposed third or fourth arm pair.

The outer ends 192 and 194 of the drive pin 190 slidably engage the third and fourth cam means 216 and 218 to translate linear reciprocal movement of the piston rod 176 to pivotal movement of the third and fourth arm pairs 140 and 150 between the first and second positions.

As shown in FIG. 9, each of the cams 210, 212, 216 and 218 is formed with a first arcuate end portion denoted generally by reference number 220 for the first cam 210 and a second contiguous substantially linear portion 222 which extends from the first end portion 220. The first arcuate end portion 220 of each of the cams and the adjacent portion of the linear portion 222 of each of the cams 210, 212, 216 and 218 results in substantially all of the pivotal movement of each of the arms from the opened to the closed positions and vice versa. The remaining portion of the linear extent of the second portions 222 of each of the cams generates high force to fixedly hold the panel member 10 as well as to urge the forming member or button 130 into the panel member 10 to form the raised pad 14 to the reference position 12 as shown in FIGS. 1–4 and described above.

Further, as shown in FIG. 9, the first arcuate end portions 220 of the first and second cams 210 and 212, respectively, in the first and second arm pairs 50 and 52 are laterally offset from the corresponding first end portions 220 of the cams 216 and 218 in the third and fourth arm pairs 140 and 150. That is, the first end portions 220 of the cams 210 and 212 are located closer to the pivot shafts 58 such that the first and second arm pairs 50 and 52 begin their pivotal movement from the open to the closed positions as the first and second link pins 206 and 208 slide from the arcuate end 220 to the opposite end of the cams 210 and 212 before the third and fourth arm pairs 140 and 150, respectively, begin their pivotal movement from the open to the closed positions via the drive pin 190 and cams 216 and 218. This is necessary so that the first and second arm pairs 50 and 52 engage and fixedly hold the panel member 10 in its actual position prior to the fourth arm pair 150 urging the button 130 into the panel member 10 to form the raised pad 14.

By way of example only of an optional feature which may be incorporated into the apparatus 22, the aperture 18 may be pierced in the raised pad 14 after the pad 14 has been formed to the reference position 12. The aperture 18 provides an attachment point for receiving a suitable fastener to connect additional members, such as outer body panels, to the inner panel member 10.

The piercing means employed in the apparatus 22 is shown in FIGS. 6, 10, 13 and 14. The piercing means denoted in general by reference number 230 includes a piercing pin mounting block 232 which is joined at opposed side walls to the third arm pairs 140 and 140', as shown in FIG. 14. Suitable key and key ways as well as fasteners may be employed to securely connect the mounting block 230 to the third arm pairs 140 and 142. An elongated pin 230 is mounted in the block 232 and extends downward therefrom. The pin end 234 of the piercing pin 230 has a diameter to slidably fit into the bore 136 in the forming button 130.

As shown in FIG. 10, when the first and second arm pairs 50 and 52 have moved to the second position engaging the panel member 10, the piercing pin 230 as well as the pad forming member 130 remain spaced from the panel member 10. Due to the linear offset arrangement of the cams in the various arm pairs, the pad forming member 130 connected to the fourth arm pair 150 will next be brought into engagement with the panel member 10 to forcibly urge a portion of the panel member 10 located between the central bore 74 in the upper hold-down member 66 upward to the reference position 12 described above. At the same time, the third arm pair 140 is pivoting the piercing pin 230 downward such that the piercing end 234 of the piercing pin 230 will subsequently pierce and form the aperture 18 in the reformed portion 14 of the panel member 10 after the reformed portion 14 has been formed or raised to the reference position 12.

A stripper 240 shown in FIGS. 6 and 7 is mounted on the outer ends of the center cam track members 180 and 182 and extends outward therefrom to overlay one surface of the panel member 10. The stripper member 240 holds the panel member 10 in position when the piercing pin 230 is withdrawn from the aperture 18 formed in the panel member 10.

The apparatus 22 described above operates according to the following method. First, the apparatus 22 locates or senses the actual position of the panel member 10. Next, the positioning means positions the holding means formed of the first and second arm pairs 50 and 52 to enable the first and second arm pairs 50 and 52 to engage the panel member 10 at the actual located position of the panel member 10. The drive means 174 is then actuated to extend the piston rod 176 to move the first and second arm pairs 50 and 52 forming the holding means into engagement with the panel member 10 to hold the panel member 10 on adjacent sides of the portion of the panel member 10 to be reformed to the reference position 12.

Next, the forming means comprising the fourth arm pair 150 is moved to urge the forming member or button 130 into the panel member 10 to reform a portion of the panel member 10 to the predetermined reference position 12.

As an optional step, the aperture 18 is pierced in the reformed portion of the panel member 10 by sequentially urging a piercing pin mounted on the end of the third arm pair 140 into the reformed portion of the panel member 10 after the portion of the panel member 10 has been formed to the reference position 12.

The method of the present invention also includes the steps of camming the holding means formed of the first and second arm pairs 50 and 52 between the first and second positions as well as camming the forming means formed of the fourth arm pair 150, and, optionally, the third arm pair 140, from a first position spaced from the panel member 10 to a second position urging the forming member 130 into the panel member 10 and to pierce the aperture 18 therein.

In these last described method steps, the step of camming the holding means from the first to the second positions is initiated before the step of camming the forming means is initiated so as to bring the holding means into engagement with the panel member before the forming means engages the panel member 10.

In summary, there has been disclosed a unique apparatus and method for forming a portion of a member, such as a body panel member, to a predetermined reference position regardless of the actual position of the panel member. The apparatus employs a single drive means to effectuate the holding and forming of the portion of the panel member to the reference position as well as optionally piercing an aperture in the reformed portion of the panel member.

What is claimed is:

1. An apparatus for reforming a portion of a member to a predetermined reference position comprising:
   a support housing;
   means, mounted on the support housing, for sensing the actual position of the member at a spaced distance with respect to the predetermined reference position;
   means, mounted in the support housing, for fixedly holding the member on adjacent sides of the portion to be reformed, the holding means being movable between a first, open, spaced apart position and a second, closed position engaging the member;
   means, mounted in the housing and responsive to the sensing means, for positioning the holding means to engage the member at the actual position of the member;
   means, mounted in the housing, for forming the portion of the member to be reformed to the predetermined reference position, the forming means being movable from a first position spaced from the member to a second position engaging the member; and
   means, mounted in the housing for moving the holding means and the forming means into engagement with the member.

2. The apparatus of Claim 1 further including:
   piercing means, mounted in the housing, for forming an aperture in the portion of the member which has been reformed to the predetermined reference position.

3. The apparatus of claim 1 wherein the sensing means comprises:

sensor means, mounted on the housing, for sensing the actual position of the member with respect to the predetermined reference position, the sensor means providing an output signal indicative of the actual position of the member with respect to the predetermined reference position.

4. The apparatus of claim 1 wherein the holding means comprises:
   first and second hold-down members engageable with opposed surfaces of the member;
   first and second arms, each having first and second ends, the first and second hold-down members being mounted on the second ends of the first and second arms, respectively; and
   the first ends of each of the first and second arms being pivotally connected to the support housing.

5. The apparatus of claim 4 wherein:
   the first and second arms each respectively comprise a pair of spaced arms.

6. The apparatus of Claim 4 wherein the positioning means comprises:
   an extensible and retractable rod;
   first and second links pivotally connected to the rod at one end and to the first and second arms at the other end; and
   drive means, responsive to the output of the sensor means, for moving the rod to a position bringing the second ends of the first and second arms and the first and second hold-down member respectively mounted thereon through the first and second links into a position such that the first and second hold-down members engage the member at the actual position of the member when the first and second arms are moved to the second, closed position.

7. The apparatus of claim 4 wherein the forming means comprises:
   third and fourth arms, each having first and second ends, the first ends of each of the third and fourth arms being pivotally connected to the support housing such that the second ends of the third and fourth arms are movable between a first spaced-apart position and a second proximate position with respect to each other; and
   a forming member mounted on the fourth arm.

8. The apparatus of claim 7 wherein the third and fourth arms each respectively comprise a pair of spaced arms.

9. The apparatus of claim 7 wherein the moving means comprises:
   a fluid operated cylinder having a reciprocally extendable and retractable piston rod extending therefrom;
   pin means mounted on a first end of the piston rod transverse to the longitudinal axis of the piston rod; and
   cam means formed in the holding means and the forming means and engaged by the pin means for moving the holding means between the first and second positions and for moving the forming means between the first and second positions upon reciprocal movement of the piston rod.

10. The apparatus of claim 9 wherein the cam means comprises:
   first and second cams formed in the first and second arms, respectively, the first and second cams being identical and disposed in inverted positions with respect to the other of the first and second cams in the first and second arms;
   third and fourth cams formed in the third and fourth arms, respectively, the third and fourth cams being identical and disposed in inverted positions with respect to the opposed third and fourth cams in the other of the third and fourth arms.

11. The apparatus of claim 10 wherein:
   each of the first, second, third and fourth cams includes a first arcuate end portion and a second contiguous substantially linear portion extending from the first arcuate end portion.

12. The apparatus of claim 11 wherein:
   the first end portion of the first and second cams is linearly offset from the first end portion of the third and fourth cams such that the first and second arms begin movement from the first to the second position before the third and fourth arms begin movement from the first to the second position, respectively.

13. The apparatus of claim 10 wherein the pin means comprises:
   a first cross pin mounted on the piston rod and slidably engaging the third and fourth cams in the third and fourth arms;
   second and third cross pins slidably engageable with the first and second cams in the first and second arms, respectively; and
   a drive link having first and second ends, the drive link attached to the piston rod with the first and second ends thereof extending outward therefrom, the second and third cross pins mounted in and extending outward from the first and second ends of the drive link.

14. The apparatus of claim 1 wherein:
   the holding means includes first and second hold-down members engageable with opposed surfaces of the member, first and second arm pairs, each having first and second ends, the first and second hold-down members being mounted on the second ends of the first and second arm pairs, respectively, the first ends of each of the first and second arm pairs being pivotally connected to the support housing;
   the forming means includes third and fourth arm pairs, each having first and second ends, the first ends of each of the third and fourth arm pairs being pivotally connected to the support housing such that the third and fourth arm pairs are movable between a first spaced-apart position and a second closed position with respect to each other, forming member mounted on the fourth arm pair; and
   the moving means includes a fluid operated cylinder having a reciprocally extendable and retractable piston rod extending therefrom, pin means mounted on a first end of the piston rod transverse to the longitudinal axis of the piston rod, and cam means formed in the holding means and the forming means and engaged by the pin means for moving the holding means between the first and second positions and for moving the forming means between the first and second positions upon reciprocal movement of the piston rod.

15. The apparatus of claim 14, wherein the cam means comprises:
   first and second cams formed in the first and second arm pairs, respectively, the first and second cams being identical and disposed in inverted positions with respect to the other of the first and second cams in the first and second arm pairs;

third and fourth cams formed in the third and fourth arm pairs, respectively, the third and fourth cams being identical and disposed in inverted positions with respect to the opposed third and fourth cams in the other of the third and fourth arm pairs.

16. The apparatus of claim 15 wherein:

each of the first, second, third and fourth cams includes a first arcuate end portion and a second contiguous substantially linear portion extending from the first arcuate end portion.

17. The apparatus of claim 16 wherein:

the first end portion of the first and second cams is linearly offset from the first end portion of the third and fourth cams such that the first and second arm pairs begin movement from the first to the second position before the third and fourth arm pairs begin movement from the first to the second position, respectively.

18. The apparatus of claim 15 wherein the pin means comprises:

a first cross pin mounted on the piston rod and slidably engaging the third and fourth cams in the third and fourth arm pairs;

second and third cross pins slidably engageable with the first and second cams in the first and second arm pairs, respectively; and a drive link having first and second ends, the drive link attached to the piston rod with the first and second ends thereof extending outward therefrom, the second and third cross pins mounted in and extending outward from the first and second ends of the drive link.

19. A method of reforming a portion of a member at an actual position to a predetermined reference position comprising the steps of:

sensing the actual position of the member;

positioning member holding means to engage the member at the actual position of the member in response to said sensing;

moving the member holding means into engagement with the member to hold adjacent sides of the portion of the member to be reformed; and moving forming means into the member to reform a portion of the member between the holding means to the predetermined reference position.

20. The method of claim 19 further including the step of:

piercing the portion of the member which has been reformed to the predetermined reference position.

21. The method of Claim 19 wherein:

the step of moving the holding means further comprises the step of camming the holding means between a first spaced-apart position and a second closed position in engagement with the member.

22. The method of claim 21 wherein:

the step of moving the forming means further comprises the step of camming the forming means from a first position spaced from the member to a second position engaging the member.

23. The method of claim 22 wherein:

the step of camming the holding means from the first to the second position is initiated before the step of camming the forming means from the first to the second position is initiated such that the holding means engages the member before the forming means engages the member.

* * * * *